United States Patent Office

3,227,682
Patented Jan. 4, 1966

3,227,682
COPOLYESTERS OF HOMOTEREPHTHALIC ACID
Edwin D. Hornbaker, Baton Rouge, La., assignor to Ethyl Corporation, New York, N.Y., a corporation of Virginia
No Drawing. Filed Oct. 19, 1961, Ser. No. 146,340
8 Claims. (Cl. 260—47)

This invention relates to copolyesters produced from a diol, terephthalic acid and homoterephthalic acid.

In the past, homopolyesters of ethylene glycol and terephthalic acid have been produced. These form polymers which, when of sufficiently high molecular weight, have high melting points, are readily crystallizable and form fibers of good physical properties. It has been noted that these homopolymers, in addition to being fiber forming, may also be extruded into films. However, the production of extruded products and films has proven difficult because of the narrow softening range which these polymers have and the ease with which they crystallize. Further, these ethylene terephthalate polymers have not proven satisfactory for purposes of molding since upon cooling they tend to shrink away from the mold and crack.

The temperatures in molding the above ethylene terephthalate polymers have proven to be very critical since a temperature that is too low will cause the polymer to fuse while temperatures that are too high will cause the polymer to flow excessively. Still further, high molecular weight polyethylene terephthalate films do not readily heat-seal and are extremely insoluble in moderately high boiling solvents, not lending themselves to solvent sealing. Thus, it is seen that the ethylene terephthalate polymers are limited in their use almost exclusively to fibers and films.

In the past, attempts have been made to overcome the objectionable properties of the ethylene terephthalate polymers by the addition of adipic acid or sebacic acid to form a copolyester. Some modification and improvement were obtained but, unfortunately, a great many of the desirable properties found in the homopolyester were not retained. For example, by forming copolyesters, products were obtained which would form solutions in certain organic solvents from which films could be cast by depositing a thin layer of the dissolved polyester on a smooth surface and evaporating the solvent. Although the physical characteristics of the copolyesters were within the broad range of vinyl films, it was found that they did not possess the high strength and toughness of the polyethylene terephthalate films. Thus, while it was shown that the copolyesters produced from these materials were different from the homopolymers and had some useful properties, it was also shown that the copolyesters lacked some of the most valuable properties of the ethylene terephthalate homopolymer.

Another prior attempt to overcome the objectionable properties exhibited by ethylene terephthalate polymers was the addition of ethylene isophthalate to the ethylene terephthalate to produce a new copolyester which has a reduced tendency to crystallize, as well as improved solubility in organic acids. These copolyesters, obtained by the reaction of terephthalic and isophthalic acids with ethylene glycol, find use primarily in the production of fibers and films. But these polyesters have some objectionable properties in that their films have low impact strength and little resistance to heat.

Accordingly, it is the object of the present invention to produce a new type of polymeric copolyester which does not suffer from the objectionable properties exhibited by the ethylene terephthalate homopolymers and by prior copolyester products involving terephthalic acid. It is a further object of the present invention to produce a copolyester which is capable of being molded. Still a further object of the present invention is to produce a copolyester which has a high melting point, good softening range, superior temperature resistance, high impact strength and little water absorption. Other objects will be clear from the following disclosure.

The above and other objects are achieved by a process of preparing polymeric copolyesters which comprises copolymerizing a diol terephthalate with a diol homoterephthalate at a temperature sufficient to polymerize the reactants. The diol terephthalate constitutes from about 75 to about 85 mol percent of the reaction mixture, the balance of said mixture being a diol homoterephthalate. The diol constituents of said terephthalate and said homoterephthalate are selected from the group consisting of aliphatic glycols containing up to about 6 carbon atoms, diphenols, and other symmetrical carbocyclic diols containing from 6 to about 24 carbon atoms. It is preferred that the diol constituents be the same. It is also preferred that the diol terephthalate be present in about 80 mol percent of the total mixture, the diol homoterephthalate constituting the remainder, or about 20 mol percent. The preferred reaction temperature of the above process ranges from about 150° C. to about 290° C.

The above and other objects are further achieved by a process of preparing polymeric copolyesters which comprises the steps of (1) condensing a diol selected from the group consisting of (A) aliphatic glycols containing up to about 6 carbon atoms and (B) diphenols and other symmetrical carbocyclic diols containing from about 6 to about 24 carbon atoms with a mixture of terephthalic acid and homoterephthalic acid, said terephthalic acid constituting from about 75 to about 85 mol percent of the mixture, the balance of said mixture being homoterephthalic acid, and said condensation reaction proceeding until said acid mixture is converted to diol phthalates, and (2) copolymerizing the diol phthalates until the polymer is formed. The product obtained by the processes described above is a moldable copolymer characterized by a relatively high resistance to water and heat. The copolymer product of this invention is composed of from about 75 to about 85 mol percent of diol terephthalate and from 25 to about 15 mol percent of diol homoterephthalate. It is preferred that the copolymer product of this invention contain about 80 mol percent of diol terephthlate since the product exhibits better molding qualities, temperature resistance and lower water absorption. The preferred diols are the aliphatic glycols containing up to about 6 carbon atoms, diphenols and other symmetrical carbocyclic diols containing from about 6 to about 24 carbon atoms since the diols in this range are more economical and provide a more workable copolymer end product. The most preferred diols are ethylene glycol and cyclohexanedimethanol since these particular diols are cheaper and copolymers made from them exhibit better properties.

The copolyesters essentially as described above exhibit superior properties of low water absorption, high tensile yield, high tensile break, high dimensional stability, high impact resistance and high temperature resistance. This is in direct contrast with other copolyesters of ethylene glycol terephthalic acid and acids such as adipic or sebacic. The ethylene homoterephthalate-terephthalate polymers of this invention exhibit superior toughness to that shown by the unoriented ethylene terephthalate polymers and, in addition, are capable of being molded.

The copolyesters of this invention are composed of molecules of high molecular weight in which there are two types of repeated units; diol terephthalate

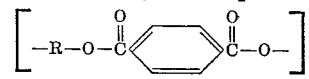

and diol homoterephthalate

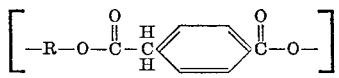

in which R is the hydrocarbon group derived from the diol.

The products of this invention are prepared by the same general methods as are employed in the preparation of other polymeric polyesters. Typical methods used are outlined throughout in "Polymer Processes," High Polymers, vol. X, by Schildknecht, Interscience Publishers, Inc., New York, 1956, and more specifically on pages 254 through 256. There are two general types of reactions whereby the esters of the diol are obtained, one of which is the direct reaction of the dibasic acid with the desired diol. The other general method, which is preferred, is the ester exchange reaction wherein the diol is heated with lower alkyl esters of terephthalic and homoterephthalic acids in the presence of a catalyst. The alcohol by-product produced in the ester exchange reaction is distilled off or evaporated during the ester exchange process. Generally, the dibasic acid ester products are then polymerized by further heating under a vacuum in the presence of a second catalyst. The process by which the products of this invention are produced can be better understood by the following working examples in which all parts are by weight unless otherwise specified.

EXAMPLE I

Dimethylterephthalate (8 parts) and 2 parts of dimethylhomoterephthalate were mixed with 15 parts of ethylene glycol in a reaction vessel. The catalyst, tetraisopropyltitanate, 0.05 percent by weight, was added to the reaction mass. The mixture was heated to a temperature of 165–180° C. for one hour during which time the methanol by-product distilled over. The reaction mass was transferred to a melt reactor, 0.01 percent by weight $Sb_2O_3$ was added and the mass was heated to a temperature of 240° C. under a nitrogen atmosphere at a pressure of 0.01 mm. of mercury. The product recovered at the end of the reaction was a polymer having an inherent viscosity of 1.05.

The term "inherent viscosity" is represented by the symbol $\eta_{inh}$ and is a measure of the degree of polymerization of the copolyester; the greater the degree of polymerization the higher the value for $\eta_{inh}$. The equation defining the term "inherent viscosity" is $$\eta_{inh} = \frac{\ln \eta_{rel}}{C}$$

wherein C equals 0.5 gram of polymer per 100 ml. of solution at a temperature of 25° C. in a 60/40 phenol/tetrachloroethane solution.

EXAMPLE II

Dimethylterephthalate (8 parts) and 2 parts of dimethylhomoterephthalate were added to a reaction vessel containing 15 parts of cyclohexanedimethanol and 0.05 percent by weight tetraisopropyltitanate. The mixture was heated to a temperature of 165–180° C. for a period of one hour during which time the methyl alcohol by-product was distilled off.

The reaction mass was then transferred to a preheated melt reactor and 0.01 percent $Sb_2O_3$ was added. The pressure in the reactor was reduced to 0.01 mm. of mercury and nitrogen gas was passed through the reactor. The mixture was heated to a temperature of 290° C. for a period of 24 hours at the end of which time a polymer having an inherent viscosity of 0.73 was obtained.

A series of polyesters were prepared in accordance with the process of Examples I and II, the data being shown in Table I. In all runs the ratio of terephthalic acid (T) to homoterephthalic acid (HTP) was 80:20 and the diols used were ethylene glycol (EG) and cyclohexanedimethanol (CHDM). In these polymerization runs 0.05 percent tetraisopropyltitanate and 0.01 percent antimony trioxide catalyst were employed. The pressure ranged from about 0.01 to about 0.3 mm. of mercury. The relative viscosity as measured is the ratio of the flow of the polymer solution to that of the solvent through an Ostwald-Fenske viscometer. The results of these runs are tabulated below.

TABLE I
TYPICAL POLYMERS OF THIS INVENTION

| Glycol [1] | Acid [2] | Temp., °C. | Time, Hrs. | Relative Viscosity [5] | Melting Point | Molded Film |
|---|---|---|---|---|---|---|
| CHDM | T/HTP | 168-200 | 4 | 1.29 | 265-70 | |
| CHDM | T/HTP | | | 1.34 | 275-80 | Stiff, Creasable, Transparent. |
| CHDM | T/HTP | | | 1.44 | 275-80 | Do. |
| EG | T/HTP | 240 | 9 | 1.52 | | Stiff, Bendable, Transparent. |
| EG | T/HTP | 210-6 / 240 | 5 / 7.5 | 1.48 | 217-20 | Do. |
| EG | T/HTP | 240 | 7 | 1.69 | | Do. |
| EG | T/HTP | 200-30 | [3] 9 | 1.315 | 210-20 | Do. |
| EG/CHDM [4] | T/HTP | 232 | | | 185-190 | |

[1] EG = Ethylene glycol, CHDM = Cyclohexanedimethanol.
[2] T = Terephthalic acid, HTP = Homoterephthalic acid, 80/20 ratio T/HTP.
[3] 3 hours at atmospheric pressure plus 6 hours at 0.3 mm.
[4] 50:50 ratio.
[5] 0.5 percent solution in o-chlorophenol at 25° C.

EXAMPLE III

Dimethylterephthalate (7.5 parts) and 2.5 parts of dimethylhomoterephthalate are mixed in 20 parts of cyclohexanedimethanol in a rection vessel. The catalyst, tetraisopropyltitanate, 0.05 percent by weight, is added to the reaction mass and the mixture is heated to a temperature of 165–180° C. for one hour during which the methanol by-product is distilled over.

After one hour, the reaction mass is transferred to a preheated melt reactor and 0.01 percent by weight of antimony trioxide is added. The reaction mass is heated to a temperature of 240° C. under a nitrogen atmosphere at a pressure of 0.01 mm. of mercury. The product recovered is terephthalate-homoterephthalate cyclohexanedimethanol copolymer.

EXAMPLE IV

Dimethylterephthalate (8 parts) and 2 parts of dimethylhomoterephthalate were mixed with 20 parts of neopentyl glycol and the catalyst, tetraisopropyltitanate. The mixture was heated to a temperature of 170–185° C. for a period of 30 minutes. The reaction mass was then transferred to a preheated melt reactor in which the pressure was reduced to 0.03 mm. of mercury and the mass was heated to a temperature of 275° C. for a period of 7 hours. The product recovered, terephthalate-homoterephthalate neopentyl glycol polymer, had an inherent viscosity of 0.49.

EXAMPLE V

Examples I–IV are examples of melt polymerization whereas this example demonstrates interfacial polymerization. 4.6 parts of 2,2'-bis-(4-hydroxyphenyl)-propane are mixed with 2.5 parts of sodium carbonate in 200 parts of water in an atmospheric pot equipped with a high speed stirrer. To the mixture is added homoterephthaloyl chloride (0.87 part), 3.25 parts of terephthaloyl chloride and 200 parts of carbon tetrachloride. The reaction mass is heated to a temperature of 35° C. for 20 minutes to obtain the polymer.

Generally the copolyesters of this invention can be molded by any of the prior art techniques as outlined in vol. X, "High Polymers," by Schildknecht, Interscience Publishers, New York, 1956, at page 679 et seq. A typical method of molding is compression molding which is a non-continuous method of producing complex shapes by the influence of pressure upon a compound confined in a heated mold. Injection molding, which is employed where short cycles are desired, is a method in which plastic molding powders are heated in an enclosed cylinder to the proper temperature after which a piston pushes the resin from the cylinder into a cool mold. Jet molding is practically the same as injection molding except that in jet molding the mold is heated. Transfer molding is a cross between compression and injection molding. Transfer molding is particularly useful in making fragile parts. Other typical prior art techniques of molding or extruding may be employed and the particular technique used depends directly on the particular part to be made and the cost of the equipment to make it.

As outlined in the preceding paragraph, the copolyesters of this invention can be molded by a wide variety of methods known to the art. A convenient method of molding the copolyesters produced in accordance with this invention was achieved by placing the powdered polymer between two aluminum plates having mold-release powder thereon. The powdered polymer was then sandwiched between the two aluminum plates and placed in a hot press at a temperature ranging from about 200° C. to about 300° C., depending on the polymer being used, for a period of 2 minutes and at a pressure of 5,000 p.s.i The molded polymer is then placed in a cold press under 25,000 p.s.i. and permitted to cool. The films that were obtained by this method were used to conduct the following ASTM tests which are in accordance with the ASTM Standards of 1958.

The ethylene glycol polymers are generally hot pressed at a temperature of between about 200° C. up to about 250° C. whereas the cyclohexanedimethanol polymers are molded at temperatures ranging from about 240° C. to about 300° C. Thus, it is noted that the polymers of this invention have a wide softening range (about 50–60°) over which films are readily molded.

The data of Table II demonstrate the strength of the moldable resin of this invention as compared to commercial products nylon 66 (1:1 ratio of adipic acid to hexamethylene diamine) and nylon 610 (1:1 ratio sebacic acid to hexamethylene diamine). The tensile yield measured in pounds per square inch is the measure of stress required to produce an irreversible elongation. In other words, tensile yield is the application of force and stretching a sample of molded plastic polymer. The tensile break measured in pounds per square inch is the force required to break the sample by stretching the molded plastic. Therefore, the higher the values in pounds per square inch obtained in the test of tensile yield and tensile break the stronger the product. The tensile yield and the tensile break of the respective products were tested in accordance with ASTM Standards, Test D638–58T. From the results in Table II it is shown that the copolymer of this invention has a tensile yield which, measured in pounds per square inch, is much better than that of either nylon 66 or nylon 610, whereas the tensile break, also measured in pounds per square inch, demonstrates that the copolyester of this invention is about equal in this respect to the commercial nylon products.

Table II
COMPARATIVE STRENGTH OF POLYMERS

| ASTM D638–58T | EG-T/HTP [1] | Nylon 66 | Nylon 610 |
|---|---|---|---|
| Tensile yield strength (p.s.i.) | 6,680 | 3,860 | 4,100 |
| Tensile strength at break (p.s.i.) | 5,130 | 8,730 | 5,710 |

[1] Product of this invention, ethylene glycol terephthalic-homoterephthalic copolyester, produced in accordance with Example I, the ratio of terephthalic to homoterephthalic acid being 80:20.

The data in Table III compare the polymers of the present invention with a polymer of ethylene glycol, terephthalic acid and isophthalic acid in percent elongation and tensile impact. The percent elongation is a measure of strength, the article being extended up to a point where it will, upon releasing the force, return to its former shape. The percent elongation is a property which should be large in polymers to be used as films and should be small where polymers are being used in bearings. If it is desirable to have a polymer with elasticity, then that polymer should have a high percent elongation. The tensile impact which is measured in foot pounds per cubic inch is the test measuring the brittleness of a sample of molded polymer. Thus, the higher the number in foot pounds per cubic inch the better the polymer. The elongation test was conducted in accordance with ASTM Standards, Test D638–58T and the tensile impact test was conducted according to ASTM Standards, Test D256–56. It is noted that the ethylene glycol terephthalic-homoterephthalic acid polymer has a percent elongation of eight times greater than that of the ethylene glycol terephthalic-isophthalic copolymer. The cyclohexanedimethanol polymer has a percent elongation greater than that of the ethylene glycol terephthalate isophthalate polymer. The tensile impact of both the ethylene glycol and cyclohexanedimethanol polymers of terephthalic-homoterephthalic acids is much greater than that of the isophthalate polymer of the prior art. The data demonstrating the results of this test are shown in Table III.

Table III
COMPARATIVE EXTENSION AND BRITTLENESS TESTS

|  | EG-T/HTP [1] | CHDM-T/HTP [2] | EG-T/IP [3] |
|---|---|---|---|
| Elongation (ASTM D638–58T) (percent) | 33 | 5 | 4 |
| Tensile Impact strength (ASTM D226–56) (Ft. Lb./In.³) | 56 | 51 | 26 |

[1] Polymer of this invention, ethylene glycol terephthalic acid-homoterephthalic acid, 80:20 ratio of terephthalic to homoterephthalic acids.
[2] Polymer of this invention, cyclohexanedimethanol terephthalic acid-homoterephthalic acid, terephthalic to homoterephthalic acid ratio being 80:20.
[3] A commercial product, ethylene glycol terephthalic acid and isophthalic acid.

Heretofore water absorption has proved a tremendous problem in certain types of commercial molding resins. A moldable polymer must have a low water absorption since water absorption causes a corresponding loss of strength and increased stretching. Further, water absorption causes bubbling on molding and swelling. The data in Table IV demonstrate the low water absorption of the copolymers of this invention as compared to those of the commercial nylon products nylon 66 and 610. The water absorption tests were conducted in accordance with ASTM Standards, Test D570–57T.

Table IV

COMPARATIVE WATER ABSORPTION

| ASTM D570–57T | EG-T/HTP [1] | CHDM-T/HTP [2] | Nylon 66 | Nylon 610 |
|---|---|---|---|---|
| Water absorption, 96 hr./73° F | 0.2 | 0.4 | 6.8 | 2.2 |

[1] Polymer of this invention, ethylene glycol terephthalic acid-homoterephthalic acid, 80:20 ratio of terephthalic to homoterephthalic acids.
[2] Polymer of this invention, cyclohexanedimethanol terephthalic acid-homoterephthalic acid, 80:20 ratio of terephthalic to homoterephthalic acid.

All of the ASTM Tests disclosed hereinabove employed the procedures described in the ASTM Publications of 1958.

The polymers of this invention are generally insoluble in common hydrocarbon solvents. However, these polymers may readily be dissolved in solvents such as o-chlorophenol, the cresols, phenols, tetrachloroethane, and the like. The solubility in these selected solvents renders the moldable polymer capable of being solvent-sealed. Film polymers are generally sealed in two ways, heat-sealing and solvent-sealing. For example, polymer films produced in sheets can be connected by means of solvent-sealing.

The data in the tables above demonstrate that the present invention resides in a series of new and valuable materials. It is also apparent from the data that the products of the above invention exhibit superior properties as compared with the prior art nylons and copolyesters.

The aliphatic glycols employed in the process of this invention may be further defined as unsubstituted, saturated, aliphatic glycols containing up to about 6 carbon atoms. These may be either straight or branched chain glycols. Similarly, the carbocyclic diols employed in this invention may be defined as unsubstituted symmetrical carbocyclic diols which can generally be characterized by the formula

HO—R'—OH wherein R' can be an arylene hydrocarbon group, a symmetrical dialkylene arylene hydrocarbon group, a symmetrical cycloalkylene hydrocarbon group, or a symmetrical dialkylene cycloalkylene group.

Typical examples of the aliphatic glycols used in the process of this invention are 1,3-propane diol, 1,4-butane diol, 1,5-pentane diol, 1,6-hexane diol, neopentyl glycol, propylene glycol, 1,2-butane diol, and the like. The preferred aliphatic glycol is ethylene glycol since it is more economical and more readily available than other glycols. Typical examples of the symmetrical carbocyclic diols are 1,4-cyclohexanedimethanol, 4,4'-dicyclohexanedimethanol, 1,4-bis-(4-hydroxymethylcyclohexyl)-cyclohexane, hydroquinone, 2,2'-bis-(4-hydroxyphenyl)-propane, p-xylylene glycol, 4,4'-dihydroxybiphenyl, and the like. The preferred symmetrical carbocyclic diol used in the process of this invention is 1,4-cyclohexanedimethanol since best results are obtained when it is employed.

The diol phthalates which may also be called monomers can be prepared by any general prior art technique such as that set forth in Schildknecht, vol. X, "Polymer Processes," Interscience Publishers, Inc., 1956. The polyesters are generally prepared by bulk transesterification which is sometimes defined as an ester exchange reaction. However, the polyesters may also be produced by the direct reaction of a dibasic acid with the diol. The transesterification process is the most preferred since less undesirable side reactions occur in this method of preparation. Both the transesterification and direct esterification reactions are set forth in Schildknecht, cited hereinabove, at pages 254–256. The ester exchange reaction can generally be run at temperatures from about 120° C. to about 200° C. and it is most preferred that the temperature range from about 165° C. to about 180° C. The ratio of diol to acid mixture used is generally equivalent to a 50 percent molar excess and the time of the reaction may vary from 15 minutes up to 6 hours. The pressure employed in the ester exchange reaction is atmospheric and air is excluded from the reaction vessel. The exclusion of air is generally accomplished by the use of an inert gas blanket such as nitrogen. However, other inert gases such as argon, helium, and krypton may be used. The catalysts employed in the ester exchange reaction are any of the known prior art catalysts for this type of reaction such as tetraisopropyltitanate, tetraisobutyltitanate, and the like. Other catalysts such as those set forth in Schildknecht, cited hereinabove, at page 255 may also be employed.

The second step in the process of this invention is the polymerization step. Generally, polymerization may be achieved by any of the prior art methods as listed in Schildknecht, "Polymer Processes—High Polymers," vol. X, Interscience Publishers, Inc., New York, 1956, pages 256–266. Polymerization is generally achieved by heating the polyesters to a temperature of between about 150° C. to about 320° C. The preferred temperature employed ranges from about 200° C. to about 290° C. since cross-linking was avoided within this temperature range.

The reaction time employed in the polymerization process may range from about 70 minutes up to about 90 hours. The preferred reaction times generally vary from about 4 hours to about 80 hours since the desired product may be obtained within this time.

The pressure employed during the polymerization step may range from above atmospheric to subatmospheric pressures. However, the pressure generally employed ranges below about 20 mm. of mercury. It is most preferred, however, that the pressure range from about 0.3 to about 0.01 mm. of mercury since better results are obtained and by-products may be more easily removed.

The catalysts employed in the polymerization reaction are any of the prior art polyester polymerization catalysts such as those set forth in Schildknecht, cited hereinabove, at pages 256–266. However, it is preferred to employ antimony trioxide since this catalyst is more readily available commercially.

The moldable copolymers obtained by the process of this invention find many varied uses such as films, bearings, wheels, and the like. Further, these new copolyesters are suitable for the production of tapes and solutions.

Having thus described the novel compositions of matter and the methods of preparation, it is not intended that they be limited except as set forth in the following appended claims.

What is claimed is:

1. A moldable copolymer characterized by having a relatively high resistance to water and heat, said copolymer being composed of from about 75 to about 85 mol percent of a diol terephthalate and from about 25 to about 15 mol percent of a diol homoterephthalate; said diol being selected from the group consisting of (A) aliphatic glycols containing up to about 6 caron atoms and (B) diphenols and other symmetrical carbocyclic diols containing from about 6 to about 24 carbon atoms.

2. The copolymer of claim 1 wherein said diol is an aliphatic glycol.

3. The copolymer of claim 1 wherein said diol is ethylene glycol.

4. The copolymer of claim 1 wherein said diol is a symmetrical carbocyclic diol.

5. The copolymer of claim 1 wherein said diol is cyclohexanedimethanol.

6. The copolymer of claim 1 wherein said diol terephthalate is ethylene terephthalate, said copolymer being composed of about 80 mol percent of said ethylene terephthalate.

7. A moldable copolymer characterized by having a relatively high resistance to water and heat, said copolymer being composed of about 80 mol percent of ethylene terephthalate and about 20 mol percent of ethylene homoterephthalate.

8. A moldable copolymer characterized by having a relatively high resistance to water and heat, said copolymer being composed of about 80 mol percent of cyclohexanedimethanol terephthalate and about 20 mol percent of cyclohexanedimethanol homoterephthalate.

References Cited by the Examiner

UNITED STATES PATENTS

| | | | |
|---|---|---|---|
| 2,331,169 | 10/1943 | Bruson | 260—47 |
| 2,551,732 | 5/1951 | Drewitt et al. | 260—75 |
| 2,720,502 | 10/1955 | Caldwell | 260—75 |
| 2,901,466 | 8/1959 | Kibler et al. | 260—75 |

OTHER REFERENCES

Hill: Fibres From Synthetic Polymers, pp. 149, 150 and 152, Elsevier Polymer Series, vol. 6, London, Elsevier Publishing Co., 1953.

WILLIAM H. SHORT, *Primary Examiner.*

LOUISE P. QUAST, *Examiner.*